(12) United States Patent
Johansson et al.

(10) Patent No.: US 9,633,209 B1
(45) Date of Patent: Apr. 25, 2017

(54) CHAINING OF USE CASE-SPECIFIC ENTITY IDENTIFIERS

(71) Applicant: Amazon Technologies, Inc., Reno, NV (US)

(72) Inventors: Jesper Mikael Johansson, Redmond, WA (US); Darren Ernest Canavor, Redmond, WA (US); Daniel Wade Hitchcock, Bothell, WA (US); Bharath Kumar Bhimanaik, Bellevue, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 14/186,351

(22) Filed: Feb. 21, 2014

(51) Int. Cl.
| | |
|---|---|
| G06F 7/04 | (2006.01) |
| G06F 17/30 | (2006.01) |
| H04N 7/16 | (2011.01) |
| G06F 21/60 | (2013.01) |
| H04L 29/06 | (2006.01) |
| G06F 21/10 | (2013.01) |
| H04L 9/08 | (2006.01) |

(52) U.S. Cl.
CPC ...... G06F 21/602 (2013.01); H04L 29/06639 (2013.01); H04L 29/06646 (2013.01); H04L 63/0407 (2013.01); H04L 63/0414 (2013.01); H04L 63/0421 (2013.01); G06F 21/10 (2013.01); H04L 9/08 (2013.01)

(58) Field of Classification Search
CPC .. G06F 21/72; G06F 21/10; G06F 2221/2107; G06F 21/6254; G06F 21/602; H04L 9/08; H04L 63/0428; H04L 29/06639; H04L 29/06646; H04L 63/0407; H04L 63/0414; H04L 63/0421
USPC ........................................................ 713/189
See application file for complete search history.

(56) References Cited

U.S. PATENT DOCUMENTS

| | | | |
|---|---|---|---|
| 5,815,665 | A | 9/1998 | Teper et al. |
| 7,188,358 | B1 | 3/2007 | Hisada et al. |
| 7,600,253 | B1* | 10/2009 | Wang .............................. 726/10 |
| 8,042,193 | B1 | 10/2011 | Piliouras |
| 2005/0137981 | A1* | 6/2005 | Maes ................ H04L 29/12009 705/44 |
| 2007/0250904 | A1* | 10/2007 | Waller ............................. 726/1 |
| 2013/0007449 | A1* | 1/2013 | Rangsikitpho et al. ...... 713/168 |

(Continued)

OTHER PUBLICATIONS

U.S. Appl. No. 14/019,120 entitled "Use Case-Specific Entity Identifiers" and filed Sep. 5, 2013.

(Continued)

*Primary Examiner* — Michael S McNally
*Assistant Examiner* — Amie C Lin
(74) *Attorney, Agent, or Firm* — Thomas | Horstemeyer, LLP

(57) ABSTRACT

Disclosed are various embodiments for creating and manipulating chained entity identifiers that include multiple use case-specific entity identifiers. Each of the use case-specific entity identifiers may identify a single entity but may differ, as they are use case-specific. Further, each of the use case-specific entity identifiers may be encrypted and/or signed using different use case-specific keys. The use case-specific entity identifiers may be nested or appended within a chained entity identifier.

21 Claims, 9 Drawing Sheets

(56) References Cited

U.S. PATENT DOCUMENTS

2014/0359782 A1* 12/2014 Golic ................ G06F 21/6254
726/26

OTHER PUBLICATIONS

U.S. Appl. No. 14/019,124 entitled "Centrally Managed Use Case-Specific Entity Identifiers" and filed Sep. 5, 2013.
U.S. Appl. No. 13/561,686 entitled "Automatic Application Dependent Anonymization" and filed Jun. 30, 2012.

* cited by examiner

```
<?xml version="1.0">
    <canonical isCanonical="1"/>
    <namespace theSpace="Service1"/>
    <key id="ServiceKey1"/>
    <identifier>
    34hfsd9fndgf9yo235hxfbnp435yfgsho43jdf98y34hor
    54hfgy34ls23495jnsfu5thwls0gy34plwerjt426phfg84
    456hfgsdh0nl4t6ugo4p32l6outrepgn4l36toej34hfsd9
    fndgf9yo235hxfbnp435yfgsho43jdf98y34hols23495
    jnsfu5thwls0gy34plwerjt426phfg84456hfgsdh0nl4t6
    ugo4p32l6outrepgn4l36toej3234hfsd9fndgf9yo235h
    54hfgy34ls23495jnsfu5thwls0gy34plwerjt426phfg84
    456hfgsdh0nl4t6ugo4p32l6outrepgn4l36toej34hfsd9
    fndgf9yo235hxfbnp435yfgsho43jdf98y34hols23495
    jnsfu5thwls0gy34plwerjt426phfg84456hfgsdh0nl4t6
    ugo4p32l6outrepgn4l36toej32
    </identifier>
</xml>
```

CHAINING OF USE CASE-SPECIFIC ENTITY IDENTIFIERS

BACKGROUND

The collection and use of sensitive information deserves heightened protection. In some cases, third-party services can gain access to private user information. Such uncontrolled access to private, sensitive information could result in serious security risks, including online identity abuse.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1C depicts an example data structure representing a use case-specific entity identifier according to various embodiments of the present disclosure.

DETAILED DESCRIPTION

Figure 1A:
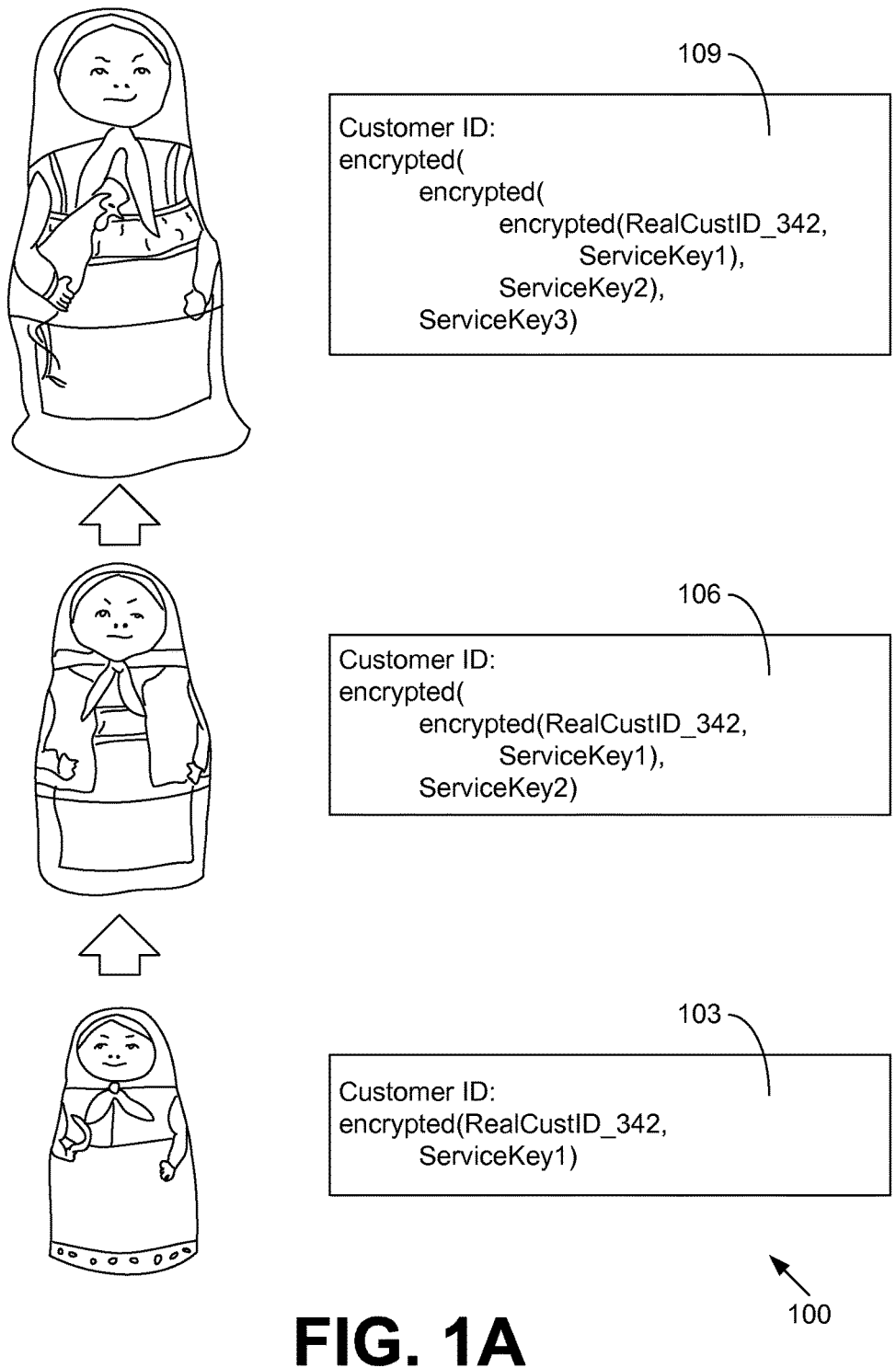
FIG. 1A is a diagram that illustrates one example of chaining use case-specific entity identifiers via a nesting approach according to various embodiments of the present disclosure.

The present disclosure relates to chaining of use case-specific entity identifiers, which may involve nesting or appending different use case-specific identifiers for a single entity. An enterprise or other organization may assign their customers unique identifiers. The unique identifiers may be important for purposes of record keeping and to associate data of various forms with the customer. Additionally, unique identifiers may provide a form of anonymization. Rather than using personally identifiable information (e.g., full name, Social Security numbers, telephone numbers, etc.), a randomized number or string may be generated and assigned as a unique identifier. Thus, if a malicious user were to gain access to a customer-associated data item, the malicious user would not know the identity of the customer merely from the unique identifier.

In one scenario, an organization may assign a single unique identifier to each customer and then associate all data pertaining to the customer with the single unique identifier. However, this presents a security risk. If a malicious user were to gain access to different types of data associated with the same unique identifier, the malicious user may learn information about the corresponding customer that may constitute an invasion of privacy. Further, in some cases, the malicious user may be able to correlate the unique identifier with personally identifiable information within the different types of data.

Various embodiments of the present disclosure protect entity identifiers by creating use case-specific, or application-specific, entity identifiers. As used herein, the term "entity" may refer to a customer or customer account, a user or user account, an organization or organizational account, and so on. In some situations, a service may be associated with a single use case, thereby making the use case-specific entity identifier a service-specific entity identifier. In other situations, a service may be associated with multiple functions or use cases for the data. In still other situations, multiple services may be associated with a particular use case. As used herein, the term "use case" refers to a specific scenario of usage for data relating to one or more functions to be performed using that data.

For example, the data pertaining to a particular service may be associated with use case-specific entity identifiers that are generated from the actual entity identifiers. Nonetheless, it may be important to facilitate correlation among the use case-specific entity identifiers on an authorized basis. For example, an application may need to correlate product purchase entity identifiers with page view entity identifiers. To this end, a use case-specific entity identifier may comprise an encrypted version of the actual entity identifier, where different encryption keys are employed for different services. A central broker may provide corresponding decryption keys to an application or service on an authorized basis. In some embodiments, the use case-specific entity identifiers may be centrally managed by an identifier translation service such that the other services need not be aware of the actual entity identifiers or perform identifier conversion functions.

Various approaches related to use case-specific entity identifiers are described in U.S. patent application Ser. No. 14/019,120 entitled "USE CASE-SPECIFIC ENTITY IDENTIFIERS" and filed on Sep. 5, 2013, U.S. patent application Ser. No. 14/019,124 entitled "CENTRALLY MANAGED USE CASE-SPECIFIC ENTITY IDENTIFIERS" and filed on Sep. 5, 2013, and U.S. patent application Ser. No. 13/561,686 entitled "AUTOMATIC APPLICATION DEPENDENT ANONYMIZATION" and filed on Jun. 30, 2012, which are incorporated herein by reference in their entireties.

In particular, the present disclosure relates to techniques for chaining use case-specific entity identifiers. For example, multiple use case-specific entity identifiers for a single entity may be aggregated into a single data structure. Each of the use case-specific entity identifiers may remain encrypted by their respective use case-specific keys to prevent unauthorized correlation of the entity identifiers. However, authorized translation or correlation of entity identifiers may be more easily performed via the chaining approaches described herein. In addition, in various embodiments, the use case-specific entity identifiers may correspond to subsets of attributes that identify a particular entity, where a combination of multiple subsets may be employed to uniquely identify the particular entity.

Turning now to FIG. 1A, shown is a diagram 100 that illustrates one example of chaining use case-specific entity identifiers via a nesting approach. The diagram 100 illustrates this example via an analogy to matryoshka dolls. With matryoshka dolls, a first doll is stored within a second doll, which is stored within a third doll, which in turn is stored within a fourth doll, and so on. In the non-limiting example of FIG. 1A, a service-specific customer identifier 103 for a first service comprises an actual customer identifier ("RealCustID_342") that is encrypted by a service-specific key ("ServiceKey1").

As the next layer according to the matryoshka doll analogy, a service-specific customer identifier 106 comprises the service-specific customer identifier 103, which in turn is encrypted using another service-specific key ("ServiceKey2"). This multiply encrypted version of the service-specific customer identifier 103 may be used as a distinct service-specific customer identifier for a second service. Alternatively, customer attributes and/or other unique identifiers may be added to the service-specific customer identifier 103 before it is encrypted within the service-specific customer identifier 106. For purposes of simplifying the illustration, such additional data is omitted from the diagram 100.

As yet another layer according to the matryoshka doll analogy, a service-specific customer identifier 109 comprises the service-specific customer identifier 106, which in turn is encrypted using yet another service-specific key ("ServiceKey3"). Again, this multiply encrypted version of the service-specific customer identifier 103 may be used as a distinct service-specific customer identifier for a third service. As before, customer attributes and/or other unique identifiers may be added to the service-specific customer identifier 106 before it is encrypted within the service-specific customer identifier 109.

For various embodiments implementing the approach of FIG. 1A, it is noted that the third service may not have direct access to the identifier used by the first service, the service-specific customer identifier 103. Should the third service need to gain access to the identifier used by the first service, the third service would need to have the service-specific key ("ServiceKey2") used to decrypt the service-specific customer identifier 106. Accordingly, a broker service may be used to provide specific keys as needed, or an identifier translation service with access to the specific keys may provide translation. Alternatively, the nested identifiers may be "unwound" by sending them in the reverse direction up the chain, so to speak, so that the appropriate service may decrypt the identifiers that are encrypted with its specific key.

Figure 1B:
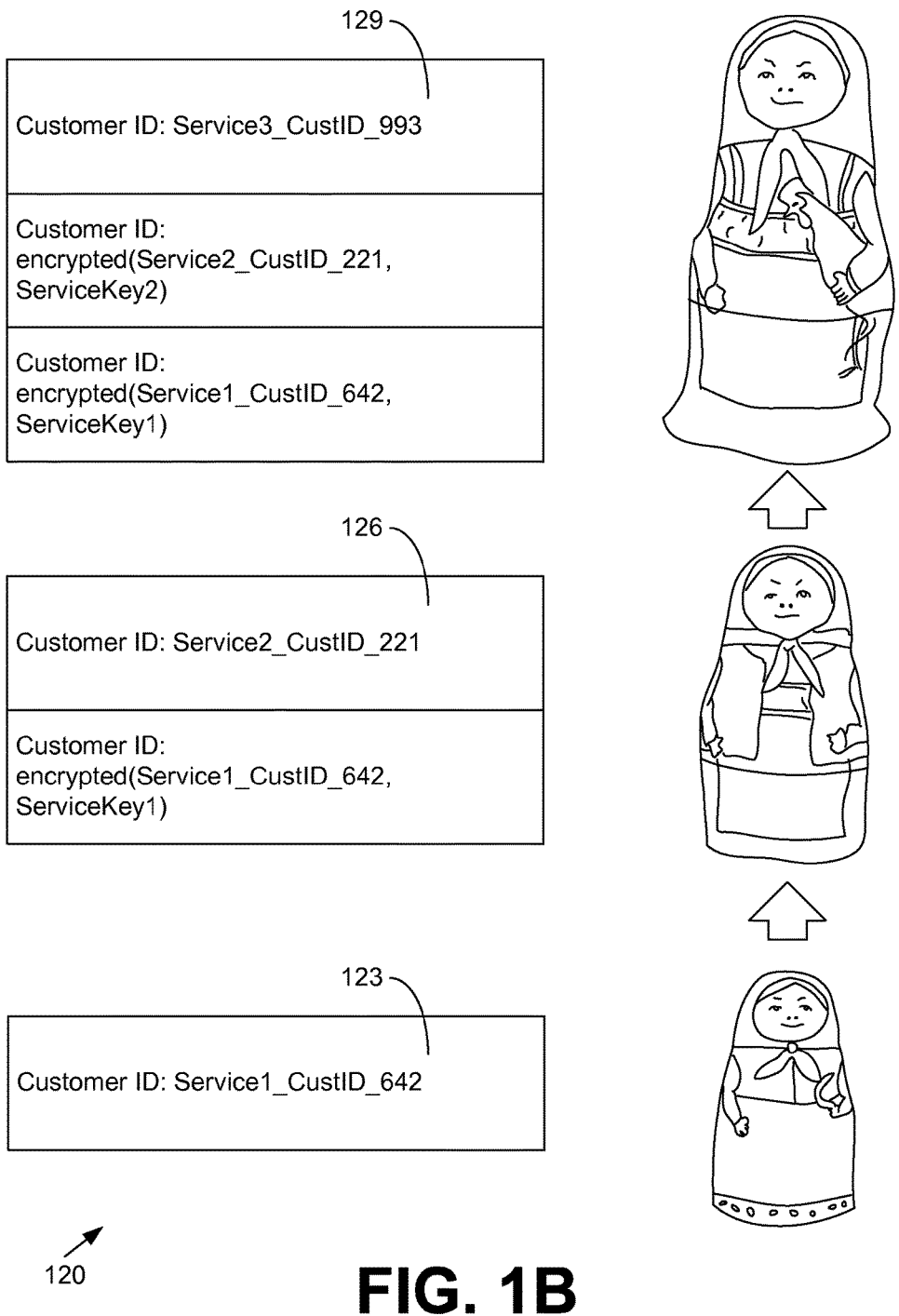
FIG. 1B is a diagram that illustrates one example of chaining use case-specific entity identifiers via an append approach according to various embodiments of the present disclosure.

Moving to FIG. 1B, shown is a diagram 120 that illustrates one example of chaining use case-specific entity identifiers via an append approach. The diagram 120 also employs the matryoshka doll analogy, but with the understanding that each doll may be independently accessible. For example, the service-specific customer identifier 123 may comprise some unique identifier ("Service1_CustID_642") that may or may not be encrypted. As the next layer, the service-specific customer identifier 126 comprises a unique identifier ("Service2_CustID_221") that may or may not be encrypted, which is appended to the service-specific customer identifier 123 that has previously been encrypted using a service-specific key ("ServiceKey1"). As yet another layer, the service-specific customer identifier 129 comprises a unique identifier ("Service3_CustID_993") that may or may not be encrypted, and the encrypted identifier is appended to the service-specific customer identifier 126, which has previously been encrypted using another service-specific key ("ServiceKey2") and which is appended to the previously encrypted service-specific customer identifier 123. Before the service-specific customer identifier 129 is shared with another service, the service-specific customer identifier 129 may be encrypted using yet another service-specific key (e.g., "ServiceKey3").

In this non-limiting example, any constituent identifier within the service-specific customer identifier 129 is directly accessible, provided that the appropriate service-specific key is available for decryption. Although the example of FIG. 1B shows each constituent identifier as a separately encrypted identifier, it is understood that the constituent identifiers may correspond to a nested version as in FIG. 1A. For example, in FIG. 1A, the service-specific customer identifier 109 may be appended to the service-specific customer identifier 106 and to the service-specific customer identifier 103 such that each constituent identifier is directly accessible. Although the discussion of FIGS. 1A and 1B pertains to customer identifiers, the principles may be generalized to entities other than customers. Similarly, though the discussion of FIGS. 1A and 1B pertains to service-specific identifiers, the principles may be generalized to use case-specific situations, some services may implement multiple use cases, and some use cases may be implemented by multiple services. Further, the function of appending may correspond to concatenating, prepending, and so on, whereby a grouping or association in a data structure is produced.

Referring next to FIG. 10, shown is an example data structure 140 representing a use case-specific entity identifier. The example data structure 140 corresponds to an extensible markup language (XML) document. Other types of data formatting may be used, e.g., yet another markup language (YAML), JavaScript object notation (JSON), relational database rows, bit masks, and so on. Fields within the example data structure 140 may include, for example, a flag indicating whether the identifier is considered canonical, a namespace for the identifier, a length of the identifier, a key identifier used to encrypt the identifier, the encrypted data for the identifier, a checksum, and/or other data.

Although the terms "encryption" and "decryption" are employed in the specification, it is understood that other cryptographic wrapping and unwrapping operations may be used in a like manner. For example, signature generation may be employed in lieu of, or in addition to, encryption. Similarly, signature verification may be employed in lieu of, or in addition to, decryption. In the following discussion, a general description of the system and its components is provided, followed by a discussion of the operation of the same.

Figure 2A:
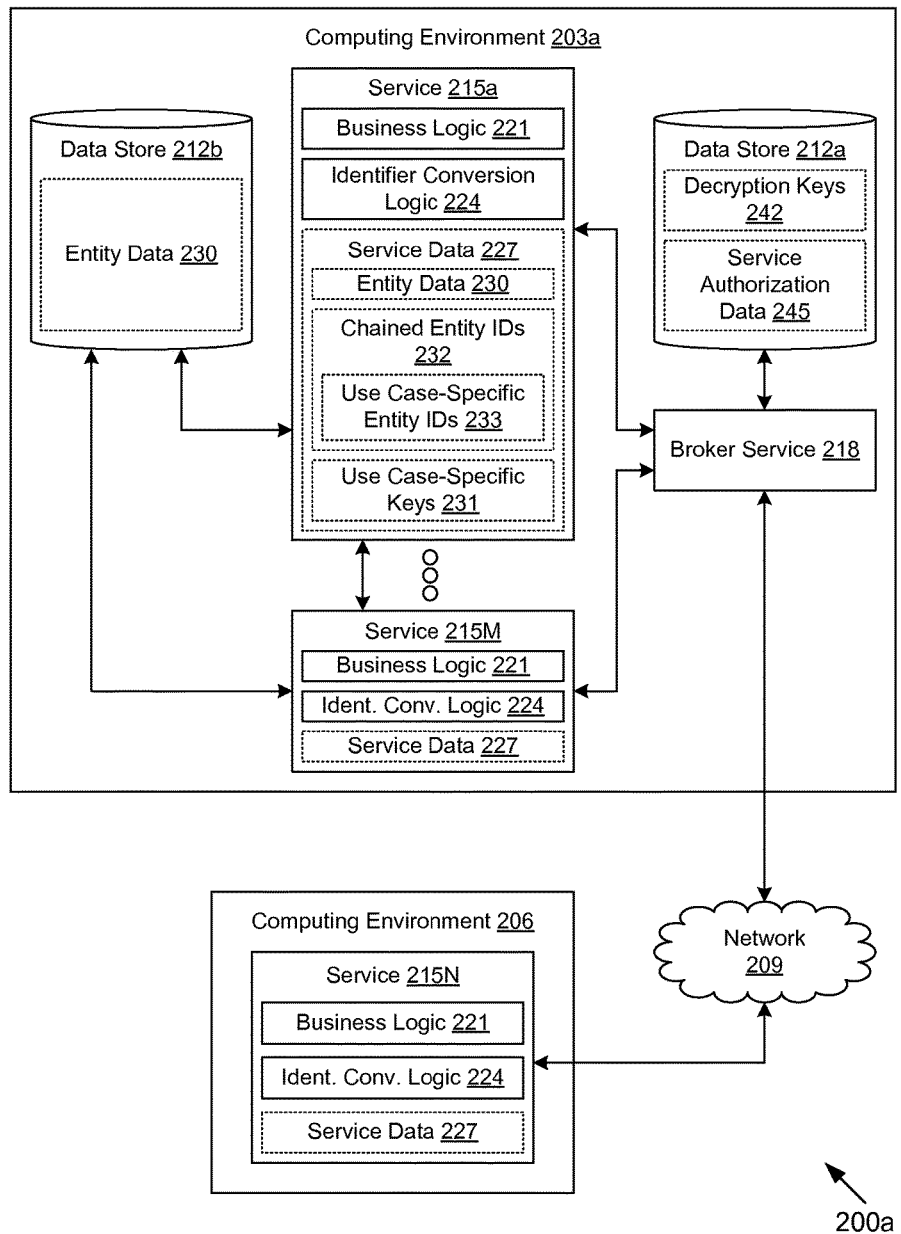
FIGS. 2A and 2B are schematic block diagrams of networked environments according to various embodiments of the present disclosure.

With reference to FIG. 2A, shown is a networked environment 200a according to various embodiments. The networked environment 200a includes a computing environment 203a and a computing environment 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203a may comprise, for example, a server computer or any other system providing computing capability. Alternatively, the computing environment 203a may employ a plurality of computing devices that may be arranged, for example, in one or more server banks or computer banks or other arrangements. Such computing devices may be located in a single installation or may be distributed among many different geographical locations. For example, the computing environment 203a may include a plurality of computing devices that together may comprise a hosted computing resource, a grid computing resource and/or any other distributed computing arrangement. In some cases, the computing environment 203a may correspond to an elastic computing resource where the allotted capacity of processing, network, storage, or other computing-related resources may vary over time.

Various applications and/or other functionality may be executed in the computing environment 203a according to various embodiments. Also, various data is stored in data stores 212a, 212b that are accessible to the computing environment 203a. Each of the data stores 212 may be representative of a plurality of data stores 212 as can be appreciated. The data stored in the data stores 212, for example, is associated with the operation of the various applications and/or functional entities described below.

The components executed on the computing environment 203a, for example, include a plurality of services 215a . . . 215M, a broker service 218, and other applications, services, processes, systems, engines, or functionality not discussed in detail herein. The services 215 and the broker service 218 may be in data communication via inter-process communication, remote method invocation, remote procedure call, simple object access protocol (SOAP), representational state transfer (REST), and/or other communication application programming interfaces (APIs). Each of the services 215 is executed to perform a business function relating to the organization operating the computing environment 203a. To this end, each of the services 215 may respectively include business logic 221, identifier conversion logic 224, service data 227, and/or other components. The service data 227 may include entity data 230, use case-specific keys 231, chained entity identifiers 232 that include one or more use case-specific entity identifiers (IDs) 233, and/or other data.

The business logic 221 performs one or more business functions, which may involve obtaining, generating, transforming, storing, and/or performing other operations on entity data 230. For example, for an organization that operates an electronic commerce system, the business logic 221 may perform network page component generation functions, data logging functions, order management functions, order fulfillment functions, shopping cart management functions, customer product review management functions, catalog management functions, and/or other functions.

The identifier conversion logic 224 is executed to translate use case-specific entity identifiers 233 that are specific to another service 215. To this end, the identifier conversion logic 224 may obtain a decryption key 242 from the broker service 218 in order to decrypt the use case-specific entity identifier 233 to obtain an entity identifier, identifier metadata, and/or another encrypted use case-specific entity identifier 233 that is nested. The identifier conversion logic 224 may then convert the actual entity identifier (or attributes of the entity) to another use case-specific entity identifier 233 that is specific to the present service 215. Some services 215 may be configured to operate upon only the use case-specific entity identifiers 233, and therefore may exclude the identifier conversion logic 224 and/or the use case-specific keys 231. Thus, some services 215 may be restricted from accessing the entity identifiers employed for other use cases.

The entity data 230 may include data records that are associated with customers of the organization or other entities. In particular, each data record may be associated with a corresponding use case-specific entity identifier 233 and/or chained entity identifier 232 to identify the corresponding customer. In one embodiment, the use case-specific entity identifier 233 comprises an encrypted version of an actual entity identifier that has been encrypted using a use case-specific key 231 and a form of reversible encryption. The actual entity identifier may comprise a number, a character string, binary data, or any other form of unique identifier. In some embodiments, the actual entity identifier for a particular use case may include a subset of attributes regarding the entity.

For example, where the entity is an individual customer, the actual entity identifier for a first use case may correspond to the customer's name and email address. Meanwhile, the actual entity identifier for a second use case may correspond to credit card information of the customer. In some scenarios, a combination of multiple subsets of attributes may be taken as uniquely identifying the entity. The use case-specific entity identifier 233 may also include a unique identifier of the use case-specific key 231 or of the service 215 pertaining to the use case-specific key 231 as well as other metadata.

In some cases, the metadata may include permissions that control whether certain services 215 are permitted to access identifiers specific to certain use cases. The permissions may be signed (e.g., by a service 215 that created the identifier) to establish authenticity, and the permissions may be enforced by the broker service 218 and/or an identifier translation service. Additionally, in various embodiments using chained entity identifiers 232, a use case-specific entity identifier 233 may incorporate, be appended to, or have nested within one or more other use case-specific entity identifiers 233 for the same entity.

The use case-specific entity identifiers 233 for the different use cases may share a unified namespace. In other words, the use case-specific entity identifiers 233 for the different use cases may be unique with respect to each other. Uniqueness may be enforced, for example, by incorporating a use case identifier. For example, a unique identifier for a use case may be included in the use case-specific entity identifiers 233 for that use case to ensure uniqueness across the use cases. In other embodiments, the use case-specific entity identifiers 233 for the different use cases may each be associated with distinct corresponding namespaces that are distinguished by context of usage. For example, if a first service 215 obtains entity data 230 from a second service 215 associated with a specific use case, the first service 215 may assume that the associated use case-specific entity identifiers 233 correspond to the namespace of the second service 215.

The use case-specific keys 231 may correspond to public/private asymmetric key pairs or symmetric keys. Where the use case-specific key 231 is a symmetric key, the use case-specific key 231 used to encrypt the use case-specific entity identifier 233 may also be used to decrypt the same. Where the use case-specific key 231 corresponds to a public/private key pair, the public key may be used to encrypt the actual entity identifier and/or other metadata, and the private key is used for decryption of the same. It is noted that a given service 215 or use case may employ multiple use case-specific keys 231. For example, a given service 215 may employ a different use case-specific key 231 for each grouping of one or more entities, e.g., groupings of one-hundred entities. Further, different use case-specific keys 231 may be employed based upon the current time, e.g., a different use case-specific key 231 is employed every thirty minutes.

In one embodiment, one of multiple use case-specific keys 231 for a use case may be selected at random to encrypt the use case-specific entity identifier 233. In one embodiment, the same one of the multiple use case-specific keys 231 for a single use case will be selected for a particular actual entity identifier in the use case-specific entity identifier 233. In another embodiment, different ones of the multiple use case-specific keys 231 for the single use case may be selected for the particular actual entity identifier.

The broker service 218 is executed to provide decryption keys 242 to services 215 upon request. For example, a first service 215 may need to convert use case-specific entity identifiers 233 generated by a second service 215. The first service 215 then may request the appropriate decryption key 242 from the broker service 218. The broker service 218 may authenticate the first service 215 and then determine whether the first service 215 should have access to the requested decryption key 242. If the first service 215 is authorized to access the decryption key 242, the broker service 218 then provides the decryption key 242 to the first service 215 via, for example, an encrypted channel of communication. Although one broker service 218 is depicted in FIG. 2A, it is understood that multiple broker services 218 may be employed. For example, one broker service 218 may be utilized by a first set of services 215, and another broker service 218 may be utilized by a second set of services 215.

The data stored in the data store 212a includes, for example, decryption keys 242, service authorization data 245, and potentially other data. In one embodiment, access to the data store 212a may be restricted to the broker service 218. In some embodiments, the data store 212a may also store the some or all of the service data 227 for the services 215. In such embodiments, access to the service data 227 may be restricted, e.g., so that a service 215 can access only its own service data 227 or other service data 227 to which it has been granted access.

The decryption keys 242 correspond to the decryption components of the use case-specific keys 231. Where the use case-specific keys 231 are symmetric keys, the decryption keys 242 may be the same as the use case-specific keys 231. Where the use case-specific keys 231 correspond to public/private key pairs, the decryption keys 242 may comprise the key pair or to the private key portion of the key pair. The service authorization data 245 includes configuration data that may allow the broker service 218 to determine whether a given service 215 is authorized to access to a particular decryption key 242. It may be the case that a given service 215 may be authorized to access only a subset of the decryption keys 242. Additionally, a given service 215 may be provided with access only at certain times, to accomplish certain tasks, or under certain conditions.

The data stored in the data store 212b includes, for example, entity data 230 and/or other data. The data store 212b may be accessible to one or more of the services 215. While, in one embodiment, entity data 230 may be stored within the service data 227 accessible only to the respective service 215, in another embodiment, the entity data 230 may be stored in the data store 212b such that a single copy of the entity data 230 may be accessible by multiple services 215. For example, multiple services 215 may implement a particular use case, and the data in the entity data 230 may be accessible via the data store 212b to each of the multiple services 215 that implement the particular use case.

Similar to the computing environment 203a, the computing environment 206 may comprise, for example, a server computer or any other system providing computing capability. Alternatively, the computing environment 206 may employ a plurality of computing devices that may be arranged, for example, in one or more server banks or computer banks or other arrangements. Such computing devices may be located in a single installation or may be distributed among many different geographical locations. For example, the computing environment 206 may include a plurality of computing devices that together may comprise a hosted computing resource, a grid computing resource and/or any other distributed computing arrangement. In some cases, the computing environment 206 may correspond to an elastic computing resource where the allotted capacity of processing, network, storage, or other computing-related resources may vary over time.

Various applications and/or other functionality may be executed in the computing environment 206 according to various embodiments. The components executed on the computing environment 206, for example, include one or more services 215N and other applications, services, processes, systems, engines, or functionality not discussed in detail herein. The services 215N may be similar to the services 215a . . . 215M illustrated in the computing environment 203a. For example, the services 215N may include identifier conversion logic 224 that assigns use case-specific entity identifiers 233 to entity data 230. The use case-specific entity identifiers 233 may use the same unified namespace as those for the services 215a . . . 215M. However, the computing environment 206 may be operated by a different organization from the organization operating the computing environment 203a. The broker service 218 may be implemented in a separate computing environment 206 in some embodiments.

Next, a general description of the operation of the various components of the networked environment 200a is provided. To begin, services 215 are configured to receive and/or generate entity data 230 using the business logic 221. The entity data 230 is associated with an actual entity identifier of a customer or other entity. The services 215 are configured to use the identifier conversion logic 224 to replace the association with the actual entity identifier with an association with a use case-specific entity identifier 233 or a chained entity identifier 232. To do this, the identifier conversion logic 224 obtains a use case-specific key 231 and encrypts the actual entity identifier, potentially along with a use case-specific entity identifier 233 for another use case. Alternatively, the identifier conversion logic 224 may simply encrypt the use case-specific entity identifier 233 for another use case using the use case-specific key 231. In some embodiments, the identifier conversion logic 224 may obtain the use case-specific key 231 from a key provider service, such as a broker service 218. The identifier conversion logic 224 may then perform various processing on the encrypted result, such as, for example, prepending a key or use case identifier, adding an expiration date, adding other metadata, and/or other forms of processing. The use case-specific entity identifier 233 is generated thereby and associated with the entity data 230 pertaining to the customer. The generated use case-specific entity identifier 233 may be incorporated in a chained entity identifier 232 and associated with the entity data 230 pertaining to the customer. Subsequently, the business logic 221 may process, store, transfer, and/or perform other operations on the entity data 230 that is associated with the customer.

In addition, services 215 may obtain entity data 230 associated with chained entity identifiers 232 that incorporate use case-specific entity identifiers 233 of other services 215 or use cases. In order to correlate the obtained entity data 230 with the entity data 230 of the present service 215, the identifier conversion logic 224 of the present service 215 may be configured to convert the use case-specific entity identifiers 233 of the other services 215 to new use case-specific entity identifiers 233 of the present service 215 as will be described. It is noted that a service 215N of a computing environment 206 may communicate with the services 215 and the broker service 218 of the computing environment 203a via the network 209 to perform the same or similar functions as the services 215 of the computing environment 203a. In some cases, the computing environments 203a and 206 may share a unified namespace for use case-specific entity identifiers 233 to assure uniqueness via resolution of potential collisions among the unique identifiers.

In some embodiments, the use case-specific keys 231 may have a fixed lifespan or may expire. To handle this, the identifier conversion logic 224 may be configured to rotate the use case-specific entity identifiers 233 and/or chained entity identifiers 232 via decryption using the old use case-specific key 231 and replacement with a new use case-specific key 231. The identifier conversion logic 224 may obtain the new use case-specific key 231 from the broker service 218 and/or provide a new corresponding decryption key 242 to the broker service 218 in various embodiments.

Figure 2B:
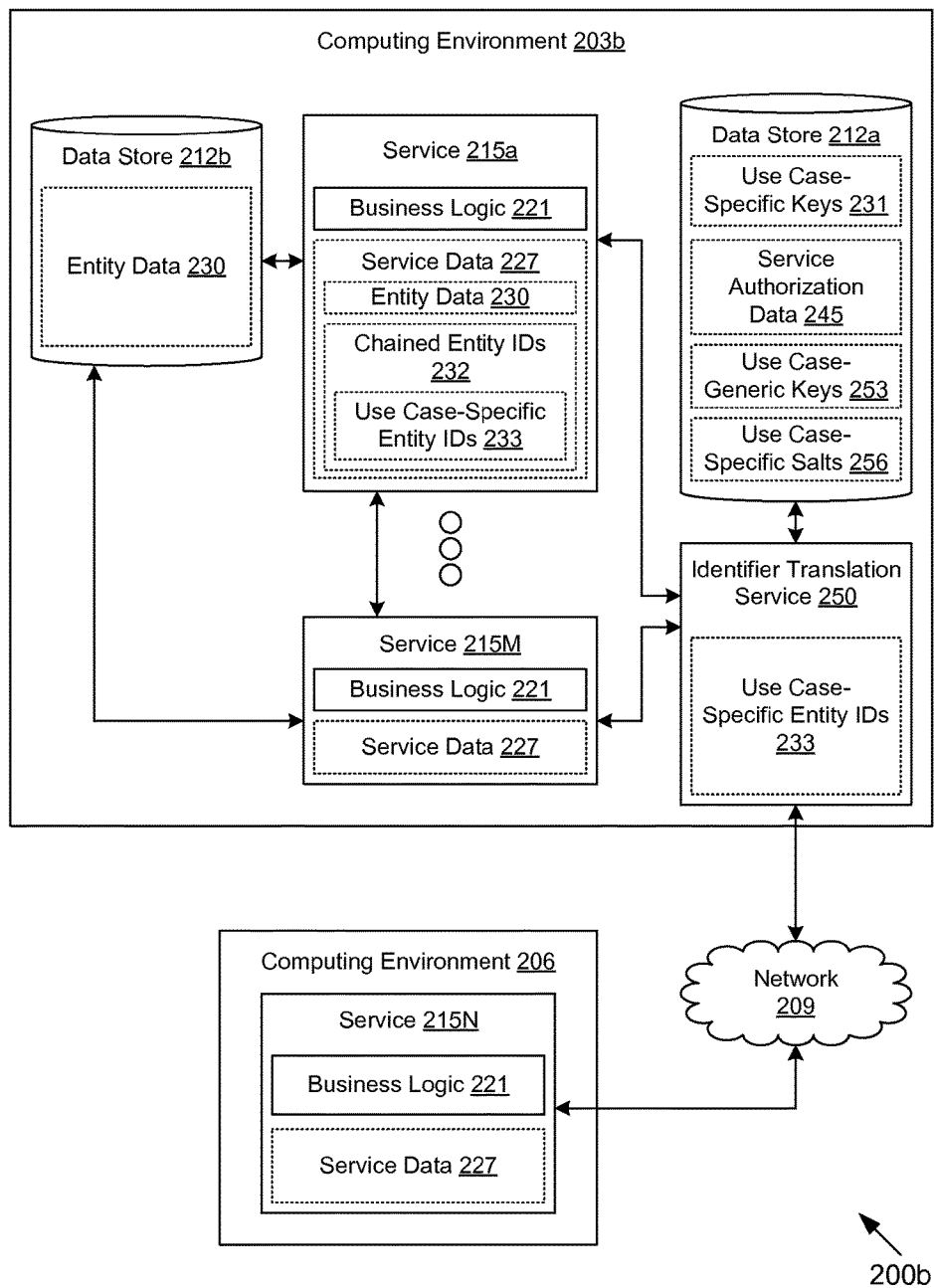

With reference to FIG. 2B, shown is a networked environment 200b according to various embodiments. The networked environment 200b includes a computing environment 203b and a computing environment 206, which are in data communication with each other via a network 209. In contrast to the computing environment 203a (FIG. 2A), the computing environment 203b includes an identifier translation service 250 in place of the broker service 218 (FIG. 2A). While in FIG. 2A, the identifier conversion logic 224 of the service 215 performs the identifier conversion, the embodiments of FIG. 2B employ a centralized identifier translation service 250. It is noted that some embodiments may employ the broker service 218 in conjunction with the identifier translation service 250.

The identifier translation service 250 is executed to receive and respond to identifier translation requests from services 215 for conversion and/or correlation of use case-specific entity identifiers 233 in a chained entity identifier 232 from one use case to another. As such, the identifier translation service 250 may perform the key management, authentication, and authorization functions of the broker service 218. By performing the identifier conversion in the identifier translation service 250, the individual services 215 need not be provided with decryption keys and need not have access to the entity identifiers. The identifier translation service 250 may also function to update expired use case-specific entity identifiers 233 that were encrypted using a key that has expired or will soon expire.

As shown, the use case-specific entity identifiers 233 from a chained entity identifier 232 may be accessible to the identifier translation service 250. In some cases, the identifier translation service 250 may be configured to cache the translation and/or correlation between use case-specific entity identifiers 233 to provide a faster response. Although one identifier translation service 250 is depicted in FIG. 2B, it is understood that multiple identifier translation services 250 may be employed. For example, one identifier translation service 250 may be utilized by a first set of services 215, and another identifier translation service 250 may be utilized by a second set of services 215.

In one embodiment, the identifier translation service 250 may be configured to function as a transparent proxy. For example, rather than merely translating use case-specific entity identifiers 233, the identifier translation service 250 may be configured to pass a service call from one service 215 to another service 215. In passing the service call onto the other service 215, the identifier translation service 250 may perform the translation of the use case-specific entity identifiers 233. The translation may occur in the opposite direction as well, when the response is returned to the service 215 that originated the service call.

The data store 212a may store the use case-specific keys 231, the service authorization data 245, use case-generic keys 253, use case-specific salts 256, and/or other data. In one embodiment, the identifier translation service 250 may employ use case-specific keys 231 for encryption and decryption, similar to the identifier conversion logic 224. In another embodiment, the identifier translation service 250 may employ use case-generic keys 253 (which may be shared among multiple use cases) in conjunction with use case-specific salts 256. The use case-specific salts 256 may be employed to produce distinct use case-specific entity identifiers 233 for multiple use cases that share a use case-generic key 253. Although the term "salt" is used herein, the use case-specific salts 256 may correspond to randomization values, nonce values, or initialization vectors. The use case-specific keys 231 and/or the use case-generic keys 253 employed by the identifier translation service 250 may be symmetric keys and/or asymmetric key pairs.

In some embodiments, the identifier translation service 250 and/or the identifier conversion logic 224 (FIG. 2A) may be configured to perform the identifier translation/conversion within a trusted computing environment. For example, such a trusted computing environment may be within a secure execution platform, a trusted platform module, or a hardware security module.

Figure 3:
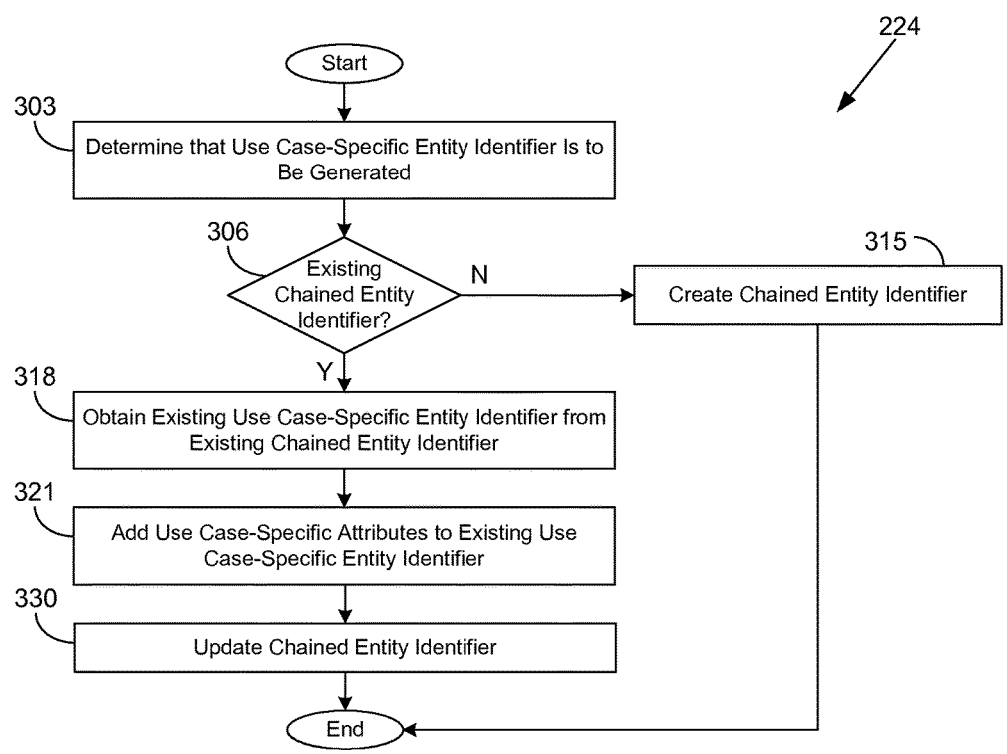
FIG. 3 is a flowchart illustrating one example of functionality implemented as portions of identifier conversion logic executed in a computing environment in the networked environment of FIG. 2A according to various embodiments of the present disclosure.

Referring next to FIG. 3, shown is a flowchart that provides one example of the operation of a portion of the identifier conversion logic 224 according to various embodiments. It is understood that the flowchart of FIG. 3 provides merely an example of the many different types of functional arrangements that may be employed to implement the operation of the portion of the identifier conversion logic 224 as described herein. As an alternative, the flowchart of FIG. 3 may be viewed as depicting an example of elements of a method implemented in the computing environment 203a (FIG. 2A) according to one or more embodiments.

Beginning with box 303, the identifier conversion logic 224 of a service 215 (FIG. 2A) determines that a use case-specific entity identifier 233 (FIG. 2A) is to be generated for a particular entity and a particular use case. In box 306, the identifier conversion logic 224 determines whether there is an existing chained entity identifier 232 (FIG. 2A) available for the particular entity. If an existing chained entity identifier 232 is not available, the identifier conversion logic 224 moves from box 306 to box 315.

In box 315, the identifier conversion logic 224 creates a chained entity identifier 232 that includes a use case-specific entity identifier 233. Additional headers and/or metadata may be included, such as, for example, an identifier of the use case-specific key 231 (FIG. 2A) used for encryption, an identifier of the particular use case to which the use case-specific entity identifier 233 pertains, and so on. In creating the chained entity identifier 233, the identifier conversion logic 224 may obtain a use case-specific key 231 for the particular use case, and then encrypt use case-specific attributes with the use case-specific key 231. For example, the attributes may comprise a subset of attributes that, when taken with other subsets of attributes, uniquely identify the entity. In another example, a unique identifier of the entity may be employed. In either case, a salt and/or additional metadata may be combined with the attributes or the unique identifier before encryption is applied. In some situations, the use case-specific entity identifier 233 may be unencrypted. In lieu of or in addition to encryption, the use case-specific attributes may be cryptographically signed. Thereafter, the portion of the identifier conversion logic 224 ends.

If, instead, an existing chained entity identifier 232 is available, the identifier conversion logic 224 proceeds from box 306 to box 318. In box 318, the identifier conversion logic 224 obtains an existing use case-specific entity identifier 233 from the existing chained entity identifier 232. In box 321, the identifier conversion logic 224 adds use case-specific attributes to the existing use case-specific entity identifier 233. The use case-specific attributes may comprise a unique identifier and/or a subset of attributes regarding the entity.

In box 330, the identifier conversion logic 224 updates the chained entity identifier 232 to include a newly generated use case-specific entity identifier 233. In one scenario, this may involve replacing the existing use case-specific entity identifier 233 in the chained entity identifier 232 (nesting approach). In another scenario, this may involve appending the newly generated use case-specific entity identifier 233 to one or more existing use case-specific entity identifiers 233, all of which correspond to the same entity (appending approach). The identifier conversion logic 224 may obtain a use case-specific key 231 corresponding to the particular use case and then may encrypt the use case-specific attributes and the existing use case-specific entity identifier (which is already encrypted) using the use case-specific key 231. In other cases, in lieu of or in addition to encryption, the use case-specific attributes and the existing use case-specific entity identifier may be cryptographically signed. Thereafter, the portion of the identifier conversion logic 224 ends.

Figure 4:
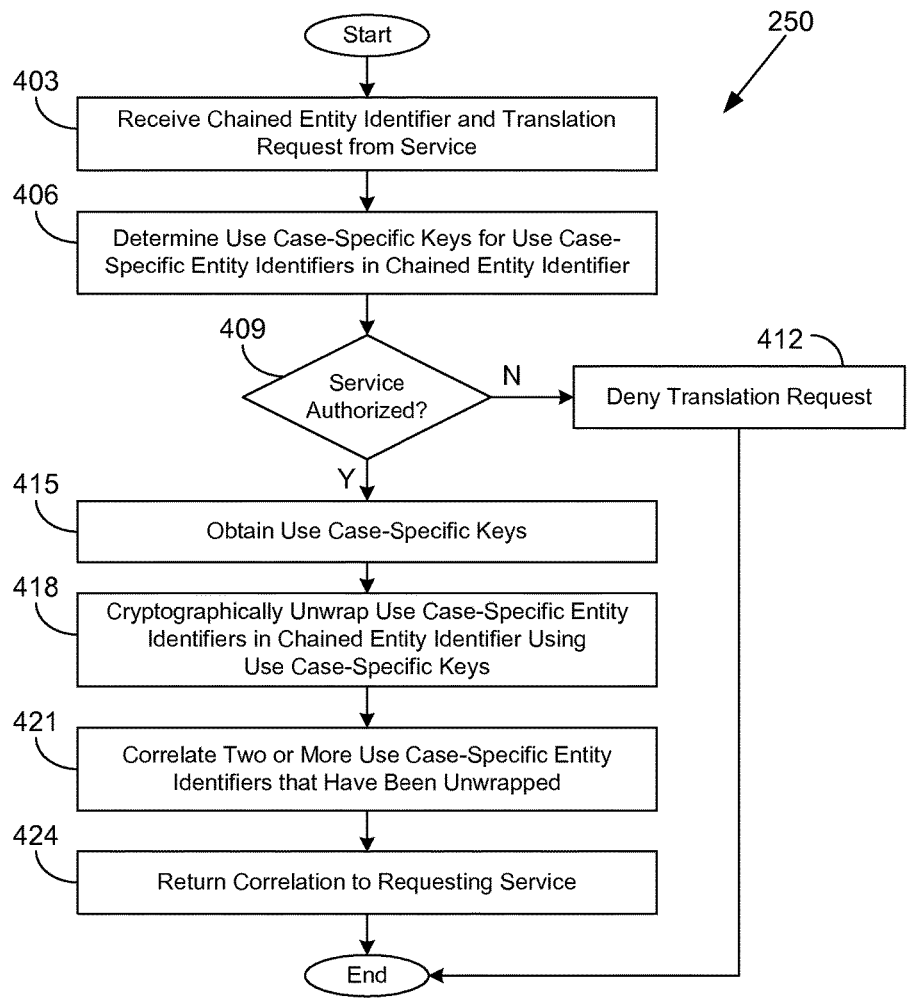
FIG. 4 is a flowchart illustrating one example of functionality implemented as portions of an identifier translation service executed in a computing environment in the networked environment of FIG. 2B according to various embodiments of the present disclosure.

Moving on to FIG. 4, shown is a flowchart that provides one example of the operation of a portion of the identifier translation service 250 according to various embodiments. It is understood that the flowchart of FIG. 4 provides merely an example of the many different types of functional arrangements that may be employed to implement the operation of the portion of the identifier translation service 250 as described herein. As an alternative, the flowchart of FIG. 4 may be viewed as depicting an example of elements of a method implemented in the computing environment 203b (FIG. 2B) according to one or more embodiments.

Beginning with box 403, the identifier translation service 250 receives a chained entity identifier 232 (FIG. 2B) and a translation request from a service 215 (FIG. 2B). In some cases, the chained entity identifier 232 is retrieved separately by the identifier translation service 250 in response to the translation request. In box 406, the identifier translation service 250 determines use case-specific keys 231 (FIG. 2B) for the use case-specific entity identifiers 233 (FIG. 2B) included in the chained entity identifier 232. The translation request may indicate that two or more of the use case-specific entity identifiers 233 are to be correlated or translated. In another embodiment, the translation request may indicate a specific one of the use case-specific entity identifiers 233 that is to be decrypted, verified, or otherwise cryptographically unwrapped, which in turn may then be correlated by the service 215 to other use case-specific entity identifiers 233 in the chained entity identifier 232.

In box 409, the identifier translation service 250 determines whether the requesting service 215 is authorized to receive the translation/correlation. For example, the identifier translation service 250 may determine from the service authorization data 245 (FIG. 2B) whether the service 215 should be granted access to the identifiers specific to a particular use case, or identifiers for particular entities. If the service 215 is not authorized to receive the translation, the identifier translation service 250 continues to box 412 and denies the translation request. Thereafter, the portion of the identifier translation service 250 ends.

If the service 215 is authorized to receive the translation, the identifier translation service 250 instead moves from box 409 to box 415. In box 415, the identifier translation service 250 obtains use case-specific keys 231 for decrypting the use case-specific entity identifiers 233 to perform the correlation. If two or more particular use case-specific entity identifiers 233 are to be correlated, additional use case-specific keys 231 may be employed to unwind intermediate cryptographic wrapping in a nested approach. In box 418, the identifier translation service 250 cryptographically unwraps use case-specific entity identifiers 233 of the chained entity identifier 232 using the use case-specific keys 231.

In box 421, the identifier translation service 250 correlates two or more use case-specific entity identifiers 233 that have been cryptographically unwrapped. In box 424, the identifier translation service 250 returns the correlation to the requesting service 215. In one example, the returned correlation may take the form of returning all of the correlated use case-specific entity identifiers 233 that have been cryptographically unwrapped. In another example, the returned correlation may take the form of one or more requested use case-specific entity identifiers 233 that have been decrypted. In this example, the requesting service 215 may retain state facilitating a correlation between its own use case-specific entity identifier 233 and the ones that are requested to be translated or cryptographically unwrapped. Thereafter, the portion of the identifier translation service 250 ends. Although the identifier translation service 250 may be implemented as a separate centrally managed service as in FIG. 2B, it is understood that in various embodiments, identifier conversion logic 224 (FIG. 2A) of the service 215 may perform translation functionality as described above.

Figure 5:
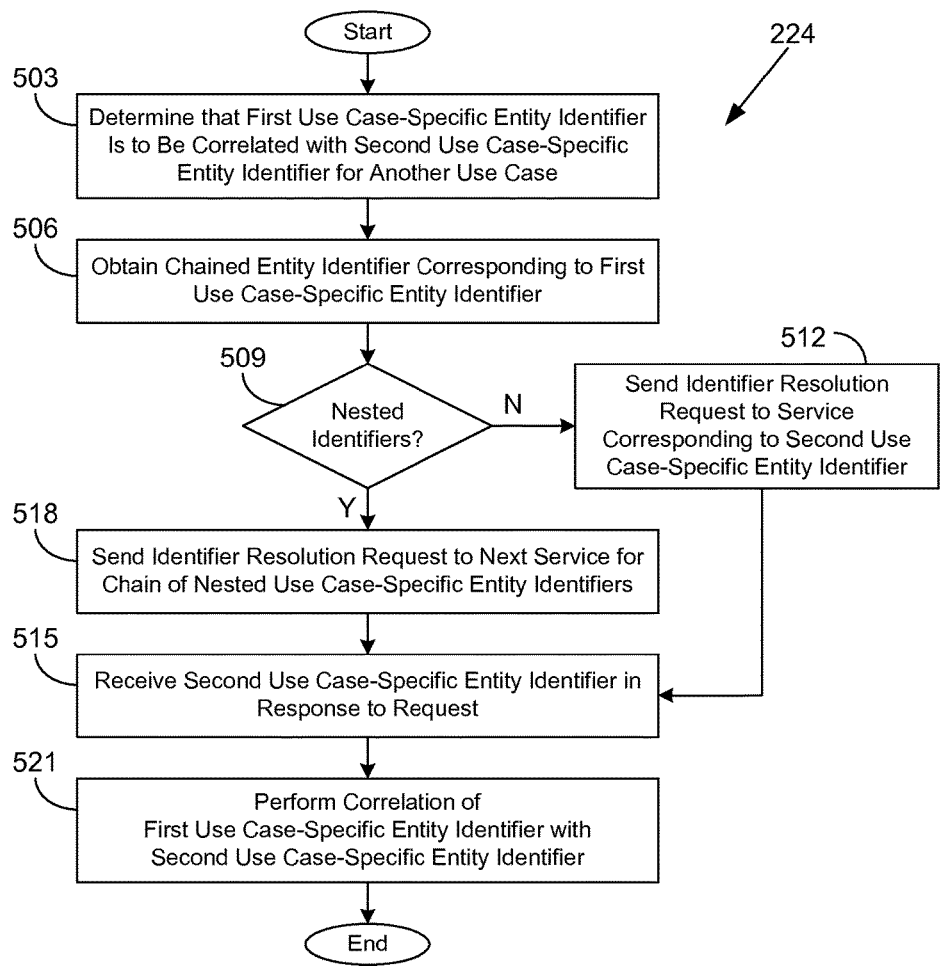
FIG. 5 is a flowchart illustrating another example of functionality implemented as portions of identifier conversion logic executed in a computing environment in the networked environment of FIG. 2A according to various embodiments of the present disclosure.

Turning now to FIG. 5, shown is a flowchart that provides another example of the operation of a portion of the identifier conversion logic 224 according to various embodiments. In particular, FIG. 5 relates to distributed resolution of use case-specific entity identifiers 233 (FIG. 2A). It is understood that the flowchart of FIG. 5 provides merely an example of the many different types of functional arrangements that may be employed to implement the operation of the portion of the identifier conversion logic 224 as described herein. As an alternative, the flowchart of FIG. 5 may be viewed as depicting an example of elements of a method implemented in the computing environment 203a (FIG. 2A) according to one or more embodiments.

Beginning with box 503, the identifier conversion logic 224 determines that a first use case-specific entity identifier 233 is to be correlated with a second use case-specific entity identifier 233 for another use case. In box 506, the identifier conversion logic 224 obtains a chained entity identifier 232

(FIG. 2A) corresponding to the first use case-specific entity identifier 233. In box 509, the identifier conversion logic 224 determines whether the chained entity identifier 232 comprises nested identifiers or appended identifiers.

If the identifier conversion logic 224 determines that the chained entity identifier 232 does not comprise nested identifiers (i.e., that appended identifiers are used), the identifier conversion logic 224 continues to box 512 and sends an identifier resolution request to a service 215 (FIG. 2A) corresponding to the second use case-specific entity identifier 233. In the appended approach, each of the use case-specific entity identifiers 233 may be directly accessible without intermediate cryptographic unwrapping being performed. Thus, the second use case-specific entity identifier 233 may be determined based upon a use case identifier, and the second use case-specific entity identifier 233 may be forwarded to the responsible service 215 for translation/resolution. The identifier conversion logic 224 continues to box 515.

If, instead, the identifier conversion logic 224 determines that nested identifiers are used, the identifier conversion logic 224 moves from box 509 to box 518. In box 518, the identifier conversion logic 224 sends an identifier resolution request to a next service 215 for the chain of nested use case-specific entity identifiers 233 in the chained entity identifier 232. It is noted that the next service 215 may not be the service 215 ultimately with access to the requested use case-specific entity identifier 233. Nonetheless, according to a nested approach, the next service 215 may be equipped to remove intermediate cryptographic wrapping and to forward the identifier resolution request onto another subsequent service 215. This may be repeated a number of times until the identifier resolution request arrives at the service 215 responsible for the particular use case and capable of translating the second use case-specific entity identifier 233.

In one embodiment, the identifier resolution request specifies a return path for the request such that the result is returned directly from the end service 215 to the requesting service 215, rather than via one or more intermediate services 215. For example, the return path may include an identifier of the requesting service 215 that originated the identifier resolution request. In another embodiment, the result may be returned in a sequential manner that reverses the request order via one or more intermediate services 215.

In box 515, the identifier conversion logic 224 receives the decrypted second use case-specific entity identifier 233 in response to the translation request. In various embodiments, the cryptographically unwrapped second use case-specific entity identifier 233 may be received directly from the service 215 that performed the translation, or back through intermediate services 215 that have propagated the request. In box 521, the identifier conversion logic 224 performs a correlation of the cryptographically unwrapped first use case-specific entity identifier 233 with the cryptographically unwrapped second use case-specific entity identifier 233. Thereafter, the portion of the identifier conversion logic 224 ends.

Figure 6:
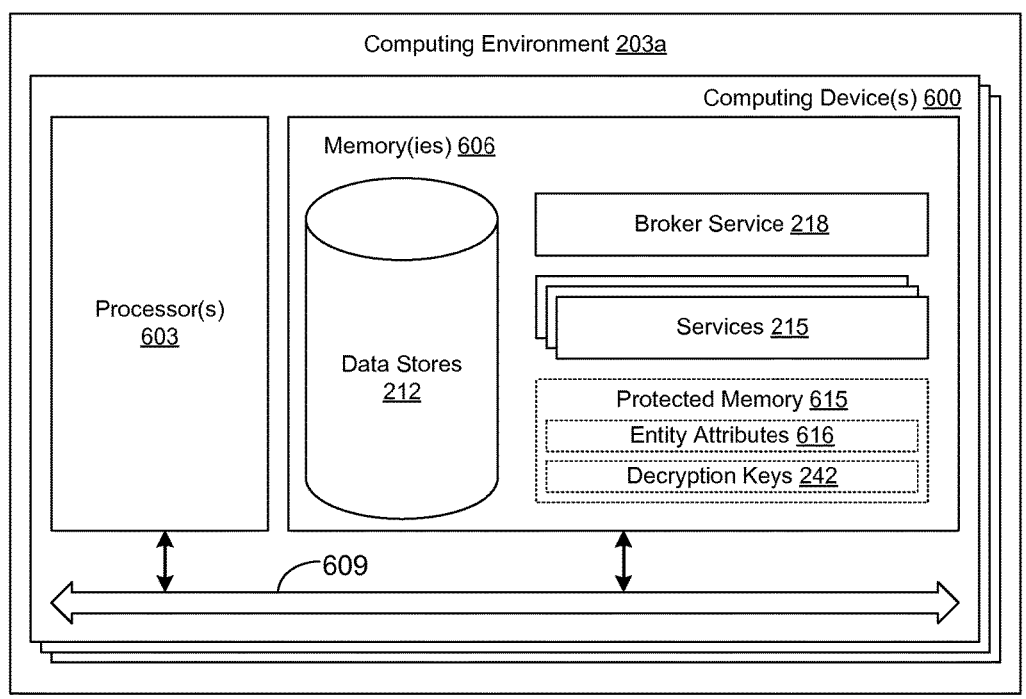
FIG. 6 is a schematic block diagram that provides one example illustration of a computing environment employed in the networked environment of FIG. 2A according to various embodiments of the present disclosure.

With reference to FIG. 6, shown is a schematic block diagram of the computing environment 203a according to an embodiment of the present disclosure. The computing environment 203a includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the services 215, the broker service 218, and potentially other applications. Also stored in the memory 606 may be data stores 212 and other data. In particular, the memory 606 may include one or more regions of protected memory 615 where access is restricted to specific processes and/or services 215. Stored in the protected memory 615 may be entity attributes 616, the decryption keys 242, and/or other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the services 215, the broker service 218, the identifier translation service 250 (FIG. 2B), the identifier conversion logic 224 (FIG. 2A), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the identifier translation service 250 and the identifier conversion logic 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the services 215, the broker service 218, the identifier conversion logic 224, and the identifier translation service 250, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the services 215, the broker service 218, the identifier conversion logic 224, and the identifier translation service 250, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203a. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one first computing device, the program, when executed, causing the at least one computing device to at least:
   receive, from a first service executed in at least one second computing device, a service call by the first service intended for a second service executed in the at least one first computing device, the service call including a chained entity identifier that includes a first use case-specific entity identifier cryptographically wrapped by a first use case-specific key;
request the first use case-specific key from a data store, wherein the first use case-specific entity identifier identifies a single entity for a first use case;
cryptographically unwrap, in response to receiving the first use case-specific key, the first use case-specific entity identifier, wherein the first use case-specific entity identifier is a second use case-specific entity identifier cryptographically wrapped by a second use case-specific key, and the second use case-specific entity identifier identifies the single entity for a second use case;
correlate the first use case-specific entity identifier that has been cryptographically unwrapped with an actual entity identifier;
determine a third use case-specific entity identifier corresponding to the actual entity identifier, wherein the third use case-specific entity identifier identifies the single entity for a third use case;
cryptographically wrap the third use case-specific entity identifier using a third use case-specific key;
update the chained entity identifier to include the third use case-specific entity identifier that has been cryptographically wrapped; and
forward the service call including the updated chained entity identifier to the second service.

2. A system, comprising:
at least one first computing device configured to at least:
receive, from a first service executed in at least one second computing device, a service call by the first service to a second service executed in the at least one computing device, the service call including a chained entity identifier;
determine, in response to receiving the chained entity identifier, a plurality of use case-specific keys capable of cryptographically unwrapping a plurality of use case-specific entity identifiers included in the chained entity identifier, the plurality of use case-specific entity identifiers corresponding to a single entity;
cryptographically unwrap the plurality of use case-specific entity identifiers using the plurality of use case-specific keys to generate a plurality of unwrapped use case-specific entity identifiers;
determine a use case-specific key capable of cryptographically unwrapping a first one of the plurality of unwrapped use case-specific entity identifiers;
cryptographically unwrap the first one of the plurality of unwrapped use case-specific entity identifiers using the use case-specific key to generate an unwrapped nested use case-specific entity identifier; and
correlate the unwrapped nested use case-specific entity identifier with a second one of the plurality of unwrapped use case-specific entity identifiers.

3. The system of claim 2, wherein cryptographically unwrapping the plurality of use case-specific entity identifiers using the plurality of use case-specific keys comprises at least one of decrypting or performing signature verification of the plurality of use case-specific entity identifiers using the plurality of use case-specific keys.

4. The system of claim 2, wherein the chained entity identifier includes a corresponding plurality of key identifiers for the plurality of use case-specific keys.

5. The system of claim 2, wherein the plurality of use case-specific entity identifiers that are cryptographically unwrapped correspond to a subset of use case-specific entity identifiers included in the chained entity identifier.

6. The system of claim 2, wherein the at least one first computing device is further configured to request the plurality of use case-specific keys from a key provider service.

7. The system of claim 2, wherein the at least one first computing device is further configured to determine whether the first service is authorized to obtain a correlation prepared via the plurality of use case-specific keys.

8. The system of claim 2, wherein individual ones of the plurality of use case-specific entity identifiers uniquely identify the single entity for corresponding ones of a plurality of use cases.

9. The system of claim 2, wherein individual ones of the plurality of use case-specific entity identifiers correspond to respective ones of a plurality of subsets of attributes of the single entity, and a combination of the plurality of subsets of attributes uniquely identify the single entity.

10. The system of claim 2, wherein individual ones of the plurality of use case-specific entity identifiers are appended to the chained entity identifier.

11. The system of claim 2, wherein individual ones of the plurality of use case-specific entity identifiers are nested within the chained entity identifier.

12. The system of claim 2, wherein the second one of the plurality of use case-specific entity identifiers is cryptographically wrapped within the first one of the plurality of use case-specific entity identifiers that has been cryptographically unwrapped.

13. A method, comprising:
receiving, via at least one of one or more computing devices, from a first service executed by a first computing device, a service call including a chained entity identifier including a first use case-specific entity identifier for a single entity;
generating, via at least one of the one or more computing devices, a second use case-specific entity identifier for the single entity, the first use case-specific entity identifier corresponding to a first use case, the second use case-specific entity identifier corresponding to a second use case;
appending, via at least one of the one or more computing devices, the second use case-specific identifier with the first use case-specific entity identifier to generate an appended identifier;
cryptographically wrapping, via at least one of the one or more computing devices, the appended identifier to generate a third use case-specific entity identifier;
updating, via at least one of the one or more computing devices, the chained entity identifier to include the third use case-specific entity identifier.

14. The method of claim 13, further comprising sending, via at least one of the one or more computing devices, an identifier translation request for the first use case-specific entity identifier to the service, wherein the first use case-specific entity identifier is cryptographically wrapped by a key accessible to the first service.

15. The method of claim 13, wherein the first use case-specific entity identifier uniquely identifies the single entity for the first use case, and the second use case-specific entity identifier uniquely identifies the single entity for the second use case.

16. The method of claim 13, wherein the first use case-specific entity identifier and the second use case-specific entity identifier individually comprise respective ones of a plurality of subsets of attributes regarding the single entity, wherein the single entity is uniquely identified by a combination of the plurality of subsets of attributes.

17. The method of claim 13, wherein updating the chained entity identifier further comprises appending, via at least one of the one or more computing devices, the third use case-specific entity identifier to the chained entity identifier.

18. The method of claim 13, wherein the appended identifier is cryptographically wrapped using a first use case-specific key.

19. The method of claim 18, wherein the first use case-specific entity identifier is cryptographically wrapped using a second use case-specific key before the first use case-specific entity identifier and the second use case-specific entity identifier are appended and cryptographically wrapped using the first use case-specific key to generate the third use case-specific identifier.

20. The non-transitory computer-readable medium of claim 1, wherein the third use case-specific entity identifier is included in the chained entity identifier by appending the third use case-specific entity identifier to the chained entity identifier.

21. The non-transitory computer-readable medium of claim 1, wherein the program further causes the at least one computing device to determine whether the first service is authorized to obtain a correlation prepared via the actual entity identifier.

* * * * *